US012731526B2

(12) United States Patent
Park et al.

(10) Patent No.: US 12,731,526 B2
(45) Date of Patent: Sep. 8, 2026

(54) METHOD OF PREDICTING LIFETIME OF DISPLAY DEVICE

(71) Applicant: Samsung Display Co., LTD., Yongin-si (KR)

(72) Inventors: Saeron Park, Yongin-si (KR); Hyun-Chang Kang, Yongin-si (KR); Gwan-Hong Min, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/422,771

(22) Filed: Jan. 25, 2024

(65) Prior Publication Data

US 2024/0257718 A1 Aug. 1, 2024

(30) Foreign Application Priority Data

Jan. 27, 2023 (KR) ........................ 10-2023-0011205

(51) Int. Cl.
*G09G 3/32* (2016.01)

(52) U.S. Cl.
CPC ......... *G09G 3/32* (2013.01); *G09G 2320/043* (2013.01)

(58) Field of Classification Search
CPC ........................... G09G 3/32; G09G 2320/043
See application file for complete search history.

(56) References Cited

U.S. PATENT DOCUMENTS

| | | | | |
|---|---|---|---|---|
| 6,337,542 | B1 * | 1/2002 | Hanaki | G09G 3/3216 345/215 |
| 9,337,826 | B2 * | 5/2016 | Koyama | H03K 17/302 |
| 11,727,845 | B1 * | 8/2023 | Ban | G09G 3/20 345/207 |
| 12,106,693 | B2 * | 10/2024 | Ban | G09G 3/3233 |
| 12,205,534 | B2 * | 1/2025 | Sun | G09G 3/3208 |
| 2011/0284899 | A1 * | 11/2011 | Hack | H10K 50/11 257/E33.061 |

(Continued)

FOREIGN PATENT DOCUMENTS

| | | |
|---|---|---|
| KR | 10-1635911 | 7/2016 |
| KR | 10-2051640 | 12/2019 |

(Continued)

OTHER PUBLICATIONS

Mannam et al., "Machine learning for faster and smarter fluorescence lifetime imaging microscopy", Journal of Physics: Photonics, Sep. 22, 2020, pp. 1-17.

(Continued)

*Primary Examiner* — William Lu
(74) *Attorney, Agent, or Firm* — Lerner David LLP

(57) ABSTRACT

A method of predicting a lifetime of a display device according to an embodiment includes creating a machine learning model based on prior degradation rate data according to a degradation time for each of pixels, measuring a first degradation rate data for each of the pixels by inputting a voltage to each of the pixels, predicting a second degradation rate data for each of the pixels using the machine learning model, and estimating a degradation rate for each of the pixels according to a degradation time based on the first degradation rate data and the second degradation rate data.

17 Claims, 6 Drawing Sheets

(56) References Cited

U.S. PATENT DOCUMENTS

| | | | | |
|---|---|---|---|---|
| 2013/0314448 | A1* | 11/2013 | Toksvig | G09G 3/342 345/102 |
| 2014/0320553 | A1* | 10/2014 | Eom | G09G 3/3208 345/77 |
| 2015/0054722 | A1* | 2/2015 | Kanda | G09G 3/3233 345/77 |
| 2015/0325172 | A1* | 11/2015 | Koyama | G09G 3/3233 345/76 |
| 2015/0356899 | A1* | 12/2015 | Yamanaka | G09G 3/3258 345/77 |
| 2017/0039933 | A1* | 2/2017 | Shin | G09G 3/3225 |
| 2017/0039953 | A1* | 2/2017 | Lee | G09G 3/3233 |
| 2017/0117374 | A1* | 4/2017 | Tanaka | H01L 29/0847 |
| 2020/0058249 | A1* | 2/2020 | Ok | G09G 3/20 |
| 2020/0226718 | A1* | 7/2020 | Reddy | G06T 3/4046 |
| 2021/0028265 | A1* | 1/2021 | Kim | G09G 3/3208 |
| 2021/0390911 | A1* | 12/2021 | Kim | G09G 3/3233 |
| 2022/0059003 | A1* | 2/2022 | Hack | G09G 3/2003 |
| 2022/0068204 | A1* | 3/2022 | Iwauchi | G09G 3/3233 |
| 2022/0130332 | A1* | 4/2022 | Ok | G09G 3/3233 |
| 2022/0148499 | A1* | 5/2022 | Han | H10K 59/00 |
| 2022/0260630 | A1* | 8/2022 | Fayneh | G01R 31/3016 |
| 2022/0343864 | A1* | 10/2022 | Kim | G09G 3/3291 |
| 2022/0366822 | A1* | 11/2022 | Leerentveld | G09G 3/3233 |
| 2023/0025419 | A1* | 1/2023 | Yoo | G09G 3/006 |
| 2023/0104466 | A1* | 4/2023 | Hong | G09G 3/32 345/694 |
| 2023/0104678 | A1* | 4/2023 | Hong | G09G 3/32 345/690 |
| 2023/0134326 | A1* | 5/2023 | Lee | G09G 3/3233 345/690 |
| 2023/0283241 | A1* | 9/2023 | Yamamoto | H03F 3/193 330/292 |
| 2024/0135880 | A1* | 4/2024 | Hong | G09G 3/20 |
| 2024/0188330 | A1* | 6/2024 | Kusunoki | H10K 59/1213 |
| 2024/0193025 | A1* | 6/2024 | Ukegawa | G06F 11/008 |
| 2024/0221622 | A1* | 7/2024 | An | G09G 3/3233 |
| 2024/0264590 | A1* | 8/2024 | Mitra | G05B 23/0254 |

FOREIGN PATENT DOCUMENTS

| | | |
|---|---|---|
| KR | 10-2400138 | 5/2022 |
| KR | 10-2022-0096885 | 7/2022 |

OTHER PUBLICATIONS

Tsai et al., "A comparative study of hybrid machine learning techniques for customer lifetime value prediction", Emerald Insight, vol. 42 No. 3, Mar. 22, 2013, pp. 357-370.

* cited by examiner

METHOD OF PREDICTING LIFETIME OF DISPLAY DEVICE

CROSS REFERENCE TO RELATED APPLICATION(S)

This application claims priority to and benefits of Korean Patent Application No. 10-2023-0011205 under 35 U.S.C. § 119, filed on Jan. 27, 2023, in the Korean Intellectual Property Office (KIPO), the entire contents of which are incorporated herein by reference.

BACKGROUND

1. Technical Field

The disclosure relates to a method of predicting a lifetime of a display device with improved efficiency and accuracy.

2. Description of the Related Art

As information technology develops, an importance of a display device as a connection medium between a user and information is being highlighted. For example, use of display devices such as a liquid crystal display device (LCD), an organic light emitting display device (OLED), a plasma display device (PDP), and a quantum dot display device is increasing.

Luminance of the pixels included in the display device decreases according to a driving period, which is a major cause of degrading a quality of the display device. For example, afterimages may appear due to non-uniform degradation according to the driving period, or color distortion may occur due to a difference in degradation speed at each location.

Accordingly, various methods for estimating the lifetime of the display device based on degradation rate data of each of the pixels have been studied.

SUMMARY

Embodiments provide a method of predicting a lifetime of a display device with improved efficiency and accuracy.

A method of predicting a lifetime of a display device according to an embodiment may include creating a machine learning model based on prior degradation rate data according to a degradation time for each of pixels, measuring a first degradation rate data for each of the pixels by inputting a voltage to each of the pixels, predicting a second degradation rate data for each of the pixels using the machine learning model, and estimating a degradation rate for each of the pixels according to a degradation time based on the first degradation rate data and the second degradation rate data.

In an embodiment, the measuring of the first degradation rate data may be performed in a first period having a first time length, and the predicting of the second degradation rate data may be performed in a second period having a second time length.

In an embodiment, the second period may follow the first period.

In an embodiment, an end time of the first period and a start time of the second period may be same.

In an embodiment, the first time length of the first period and the second time length of the second period may be same.

In an embodiment, the first time length of the first period may be shorter than the second time length of the second period.

In an embodiment, the machine learning model may be created based on Linear Regression, Polynomial Regression, Principal Components Regression, Partial Least Squares Regression, Random Forest, Gradient Boosting, Extreme Gradient Boosting, Ridge Regression, and/or Lasso Regression.

In an embodiment, the machine learning model may be created based on Multilayer Perceptron, Bayesian Neural Networks, Radial Basis Functions, Generalized Regression Neural Networks, K-Nearest Neighbor Regression, Classification And Regression Tree, Support Vector Regression, and/or Gaussian Processes.

In an embodiment, each of the pixels may include a light emitting device which emits light and a driving element providing a driving current to the light emitting device.

In an embodiment, in the estimating of the degradation rate for each of the pixels, the degradation rate may be estimated by modeling degradation amount information of the light emitting device with a degradation model defined as a degradation rate function over time.

In an embodiment, the degradation model may be expressed by Equation 1 below.

$$\frac{L(t)}{L(0)} = A_0 e^{-1\times\left(\frac{t}{\tau}\right)^{\beta}} \quad \text{[Equation 1]}$$

In the Equation 1, L(t) may be a current luminance, L(0) may be an initial luminance, $A_0$ may be an initial value of a degradation rate, t may be a parameter which determines a rate of luminance decrease, β may be a parameter which determines a form of luminance decrease, and t may be time for which luminance decrease proceeded.

In an embodiment, in the estimating of the degradation rate for each of the pixels, the degradation rate may be estimated by modeling degradation amount information of the light emitting device and a degradation amount information of the driving element with a degradation model defined as a degradation rate function over time.

In an embodiment, the degradation model may be expressed by Equation 2 below.

$$\frac{L(t)}{L(0)} = \left[1 + k \times \left\{1 - e^{-1\times\left(\frac{t}{\varepsilon}\right)^{\gamma}}\right\}\right] \times e^{-1\times\left(\frac{t}{\tau}\right)^{\beta}}. \quad \text{[Equation 2]}$$

In the Equation 2, L(t) may be a current luminance, L(0) may be an initial luminance, each of τ and ε may be a parameter which determines a rate of luminance decrease, each of β and γ may be a parameter which determines a form of luminance decrease, and t may be time for which luminance decrease proceeded.

In an embodiment, the light emitting device may include an organic material.

The method of predicting the lifetime of the display device according to embodiments may include the creating of the machine learning model based on the prior degradation rate data according to the degradation time of each of the pixels and the predicting of the second degradation rate data for each of the pixels by using the machine learning model. A degradation rate of each of the pixels may be estimated using the second degradation rate data, and a lifetime of the display device may be predicted.

Accordingly, time required to derive degradation rate data for each of the pixels through an actual experiment may be reduced. Accordingly, efficiency of a process for estimating the lifetime of the display device may be improved.

According to the method of predicting the lifetime of the display device, a degradation rate for each of the pixels may be estimated through the first degradation rate data derived by measuring a luminance decrease data for each of the pixels and the second degradation rate data derived by predicting a luminance decrease data for each of the pixels derived by predicting a luminance decrease data for each of the pixels using the machine learning model.

Accordingly, it is possible to reduce an error in an estimated degradation rate compared to a process of estimating a degradation rate only through the measured degradation rate data. Accordingly, accuracy of a process for estimating the lifetime of the display device may be improved.

It is to be understood that both the foregoing general description and the following detailed description are intended to provide further explanation of the disclosure.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
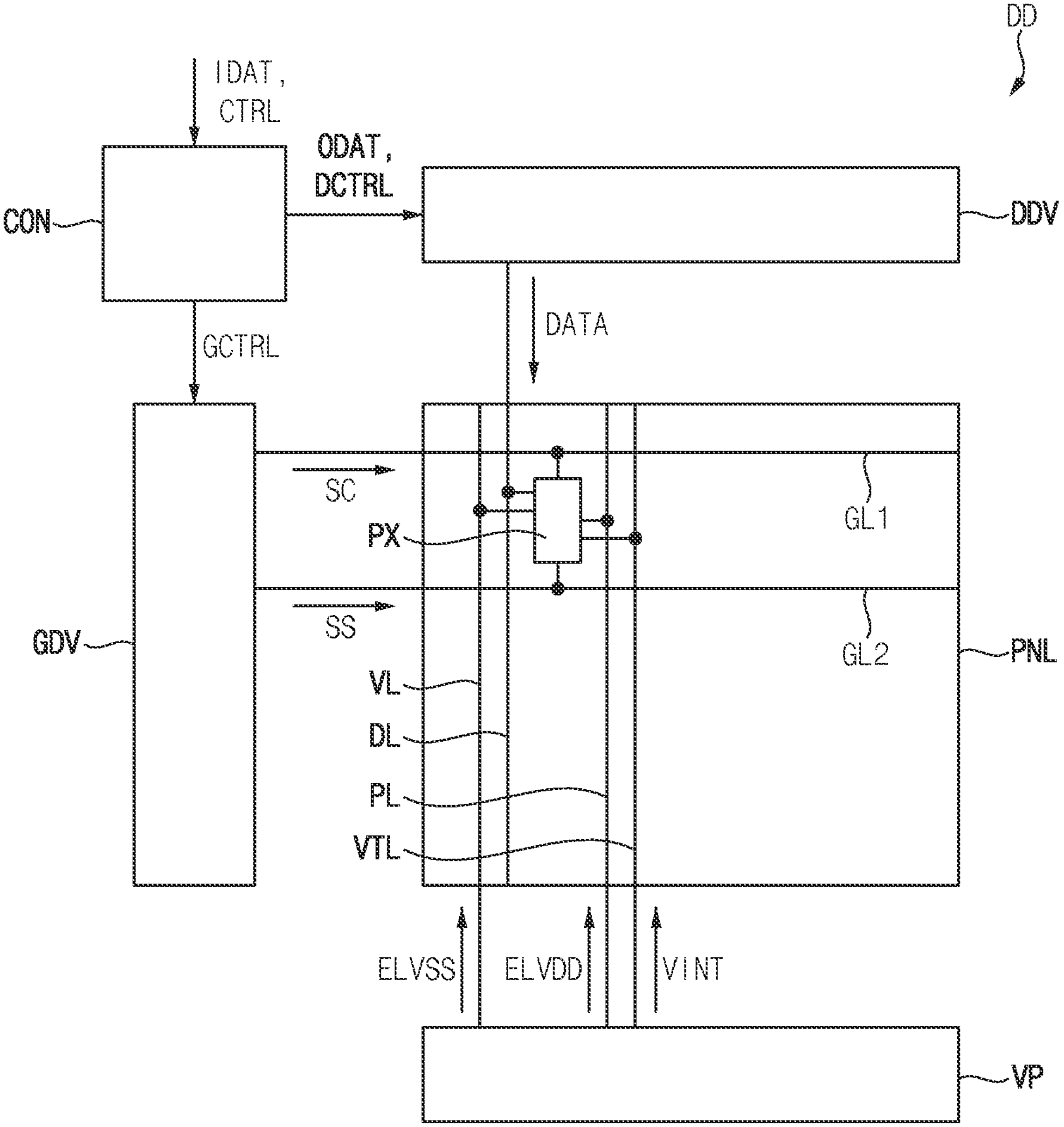
FIG. 1 is a schematic block diagram illustrating a display device according to an embodiment.

Embodiments will be described more fully hereinafter with reference to the accompanying drawings, in which various embodiments are shown. Embodiments may, however, be embodied in many different forms, and should not be construed as limited to the embodiments set forth herein. Rather, these embodiments are provided so that this disclosure will be more thorough and complete, and will fully convey the scope of the disclosure to those skilled in the art. Like reference numerals refer to like elements throughout.

When an element, such as a layer, is referred to as being “on,” “connected to,” or “coupled to” another element or layer, it may be directly on, connected to, or coupled to the other element or layer or intervening elements or layers may be present. When, however, an element or layer is referred to as being “directly on,” “directly connected to,” or “directly coupled to” another element or layer, there are no intervening elements or layers present. To this end, the term “connected” may refer to physical, electrical, and/or fluid connection, with or without intervening elements.

The terminology used herein is for the purpose of describing particular embodiments and is not intended to be limiting. As used herein, the singular forms, “a,” “an,” and “the” are intended to include the plural forms as well, unless the context clearly indicates otherwise. Moreover, the terms “comprises,” “comprising,” “includes,” and/or “including,” when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms “substantially,” “about,” and other similar terms, are used as terms of approximation and not as terms of degree, and, as such, are utilized to account for inherent deviations in measured, calculated, and/or provided values that would be recognized by one of ordinary skill in the art.

For the purposes of this disclosure, “at least one of A and B” may be construed as A only, B only, or any combination of A and B. Also, “at least one of X, Y, and Z” and “at least one selected from the group consisting of X, Y, and Z” may be construed as X only, Y only, Z only, or any combination of two or more of X, Y, and Z. As used herein, the term “and/or” includes any and all combinations of one or more of the associated listed items.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a schematic block diagram illustrating a display device according to an embodiment.

Referring to FIG. 1, a display device DD may include a display panel PNL, a data driver DDV, a gate driver GDV, a controller CON, and a voltage supplier VP.

The display panel PNL may include pixels PX. Each of the pixels PX may include at least one light emitting device (e.g., a light emitting device LED of FIG. 2) and at least one driving element (e.g., transistors T1, T2, and T3 of FIG. 2). The light emitting device may be electrically connected to the driving element. The driving element may provide a driving current to the light emitting device. The light emitting device may emit light having luminance corresponding to the driving current.

The pixels PX may receive a first gate signal SC through a first gate line GL1 and receive a second gate signal SS through a second gate line GL2. A data voltage DATA may be provided through a data line DL to the pixels PX, and an initialization voltage VINT may be provided through an initialization voltage line VTL. The data voltage DATA may be written in the pixels PX in response to the first gate signal SC, and the initialization voltage VINT may be written in the pixels PX in response to the second gate signal SS.

The data driver DDV may generate the data voltage DATA based on an output image data ODAT and a data control signal DCTRL. For example, the data driver DDV may generate the data voltage DATA corresponding to the output image data ODAT and output the data voltage DATA in response to the data control signal DCTRL. The data control signal DCTRL may include an output data enable signal, a horizontal start signal, and/or a load signal.

The gate driver GDV may generate the first and second gate signals SC and SS based on a gate control signal GCTRL. For example, each of the first gate signal SC and the second gate signal SS may include a gate-on voltage for turning on a transistor and a gate-off voltage for turning off the transistor. The gate control signal GCTRL may include a vertical start signal and/or a clock signal.

The controller CON (e.g., a timing controller) may receive an input image data IDAT and a control signal CTRL from an external host processor (e.g., GPU). For example, the input image data IDAT may be RGB data including a red image data, a green image data, and a blue image data. The control signal CTRL may include a vertical sync signal, a horizontal sync signal, an input data enable signal, a master clock signal, or the like. The controller CON may generate the gate control signal GCTRL, the data control signal DCTRL, and the output image data ODAT based on the input image data IDAT and the control signal CTRL.

The voltage supplier VP may provide a driving voltage ELVDD, a common voltage ELVSS, and the initialization voltage VINT to the pixels PX. The driving voltage ELVDD may be provided to the pixels PX through a driving line PL. The common voltage ELVSS may be provided to the pixels PX through a power line VL and a common electrode (not illustrated).

Figure 2:
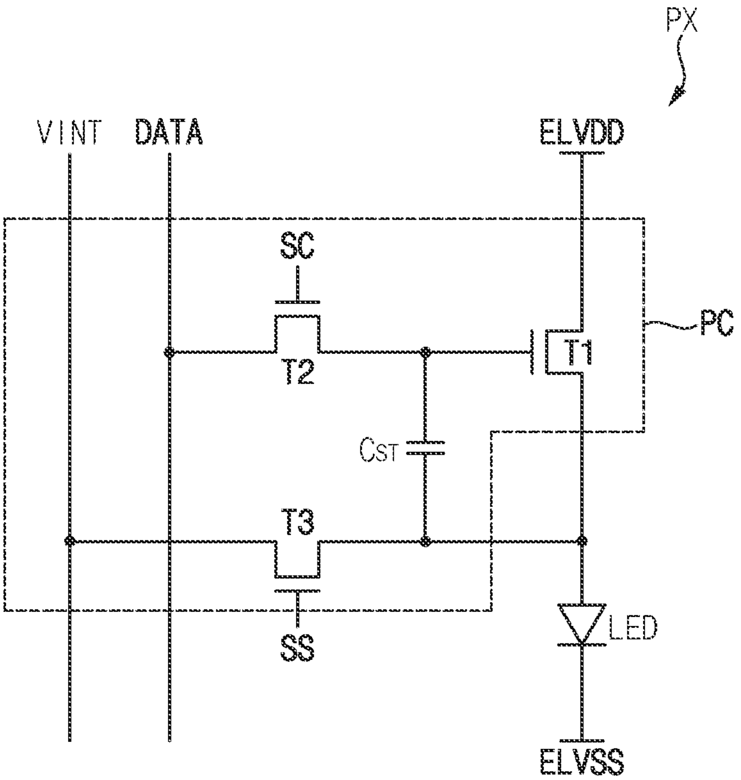
FIG. 2 is a schematic diagram of an equivalent circuit of a pixel included in the display device of FIG. 1.

FIG. 2 is a schematic diagram of an equivalent circuit of a pixel included in the display device of FIG. 1.

Referring to FIG. 2, the pixels PX may include a pixel circuit PC and a light emitting device LED. The light emitting device LED may be electrically connected to the pixel circuit PC. For example, the light emitting device LED may receive a driving current from the pixel circuit PC. In an embodiment, the pixel circuit PC may include a first transistor T1, a second transistor T2, a third transistor T3, and a storage capacitor CST.

The first transistor T1 may include a first terminal, a second terminal, and a gate terminal. The first terminal may receive the driving voltage ELVDD. The second terminal may be connected to the light emitting device LED. The gate terminal may be connected to the second transistor T2. The first transistor T1 may generate the driving current based on the driving voltage ELVDD and the data voltage DATA.

The second transistor T2 may include a first terminal, a second terminal, and a gate terminal. The first terminal may receive the data voltage DATA. The second terminal may be connected to the first transistor T1. The gate terminal may receive the first gate signal SC. The second transistor T2 may transfer the data voltage DATA to the first transistor T1 in response to the first gate signal SC.

The third transistor T3 may include a first terminal, a second terminal, and a gate terminal. The first terminal may be connected to the first transistor T1. The second terminal may receive the initialization voltage VINT. The gate terminal may receive the second gate signal SS. The third transistor T3 may transmit the initialization voltage VINT to the first transistor T1 in response to the second gate signal SS.

The storage capacitor CST may include a first terminal and a second terminal. The first terminal may be connected to the gate terminal of the first transistor T1. The second terminal may be connected to the first terminal of the third transistor T3. The storage capacitor CST may maintain a voltage level of the gate terminal of the first transistor T1 during an inactive period of the first gate signal SC.

The light emitting device LED may include a first terminal and a second terminal. The first terminal may be connected to the second terminal of the first transistor T1. The second terminal may receive the common voltage ELVSS. The light emitting device LED may emit light having luminance corresponding to the driving current. In an embodiment, the light emitting device LED may include an organic light emitting diode using an organic material as an emission layer. However, the disclosure is not necessarily limited thereto, and the light emitting device LED may include an inorganic light emitting diode using an inorganic material as an emission layer.

Figure 3:
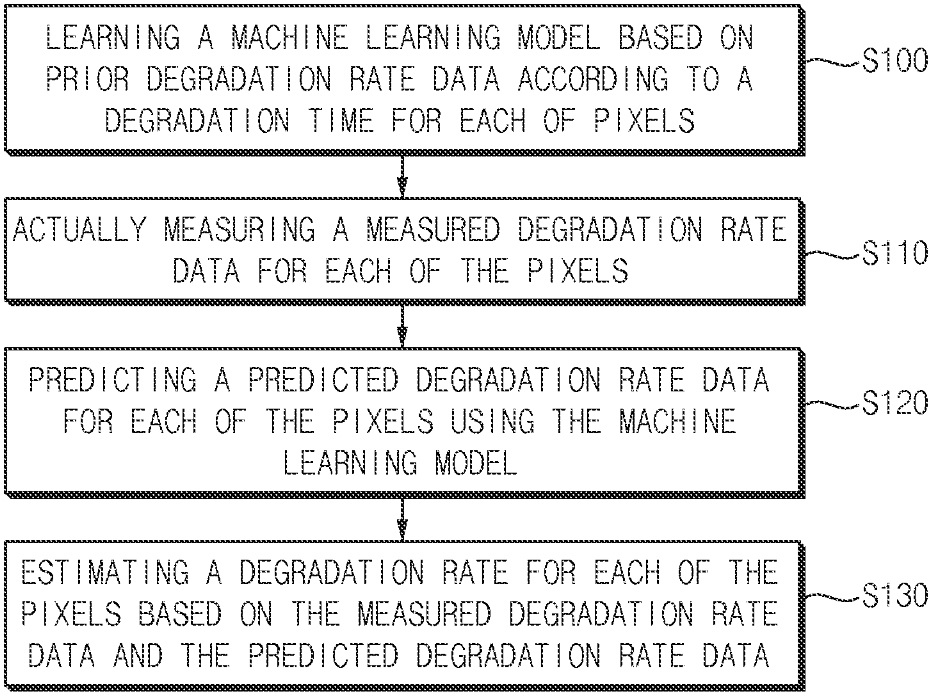
FIG. 3 is a flowchart illustrating a method of predicting lifetime of the display device of FIG. 1.
Figure 4:
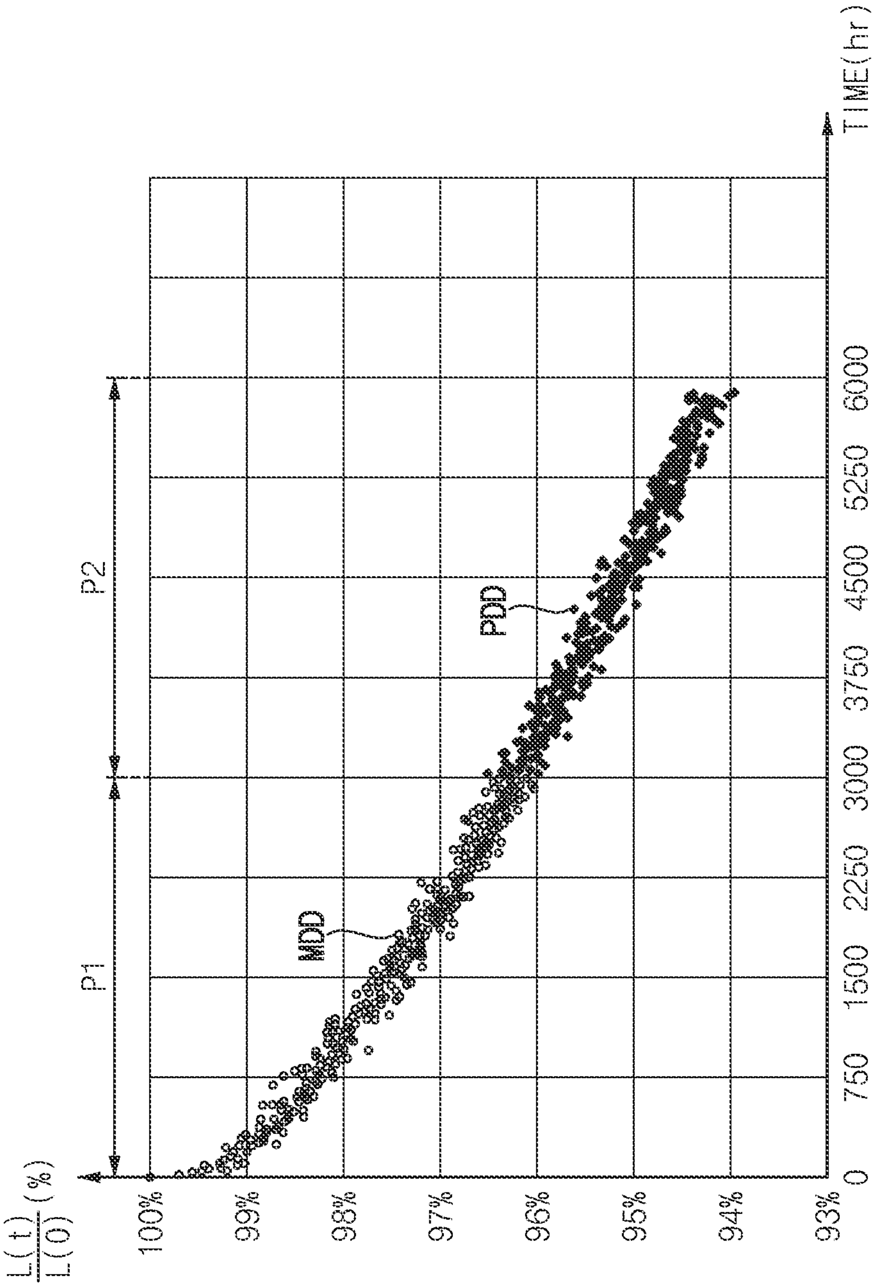
FIG. 4 is a graph illustrating a degradation rate data obtained by the method of predicting lifetime of the display device of FIG. 3 according to an embodiment.
Figure 5:
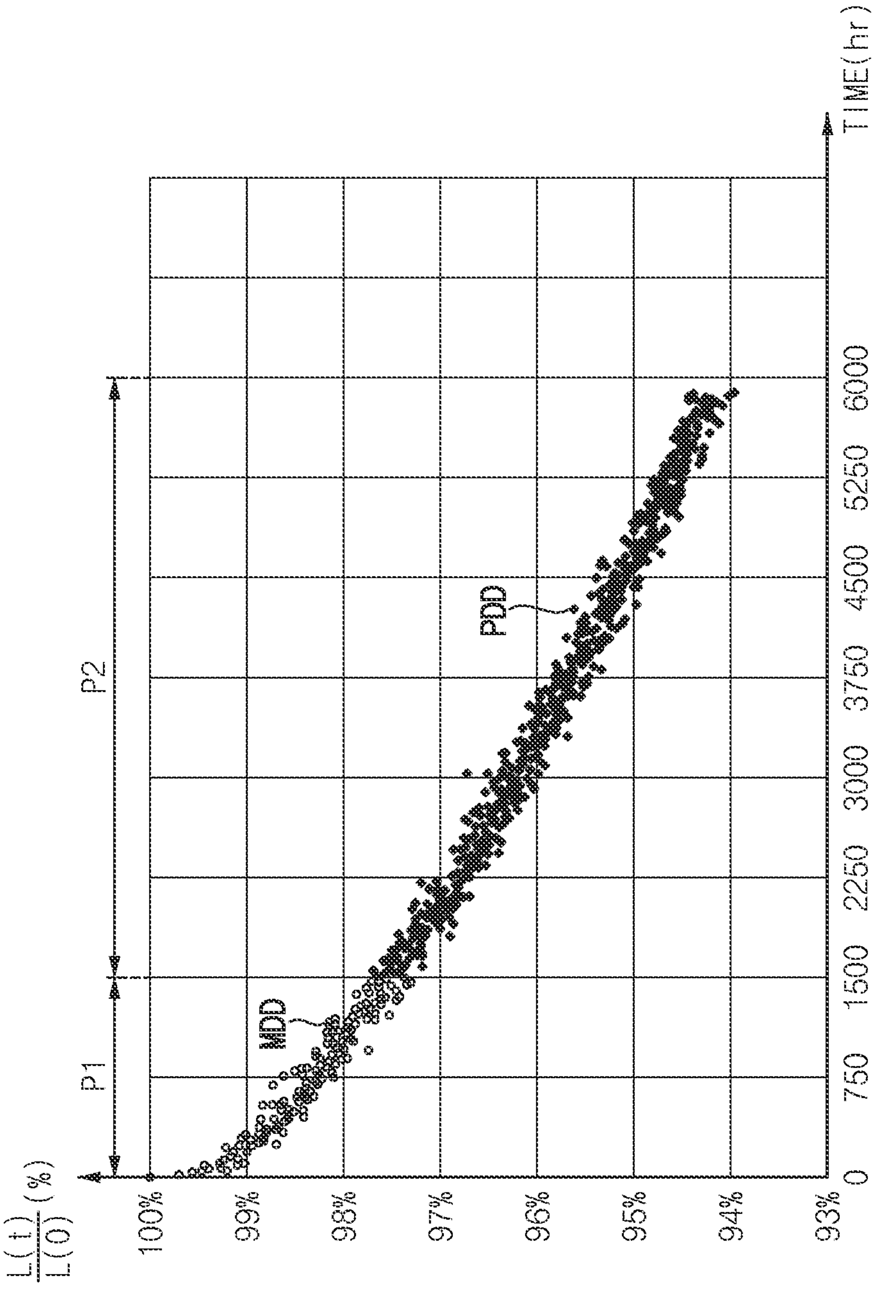
FIG. 5 is a graph illustrating a degradation rate data obtained by the method of predicting lifetime of the display device of FIG. 3 according to another embodiment.
Figure 6:
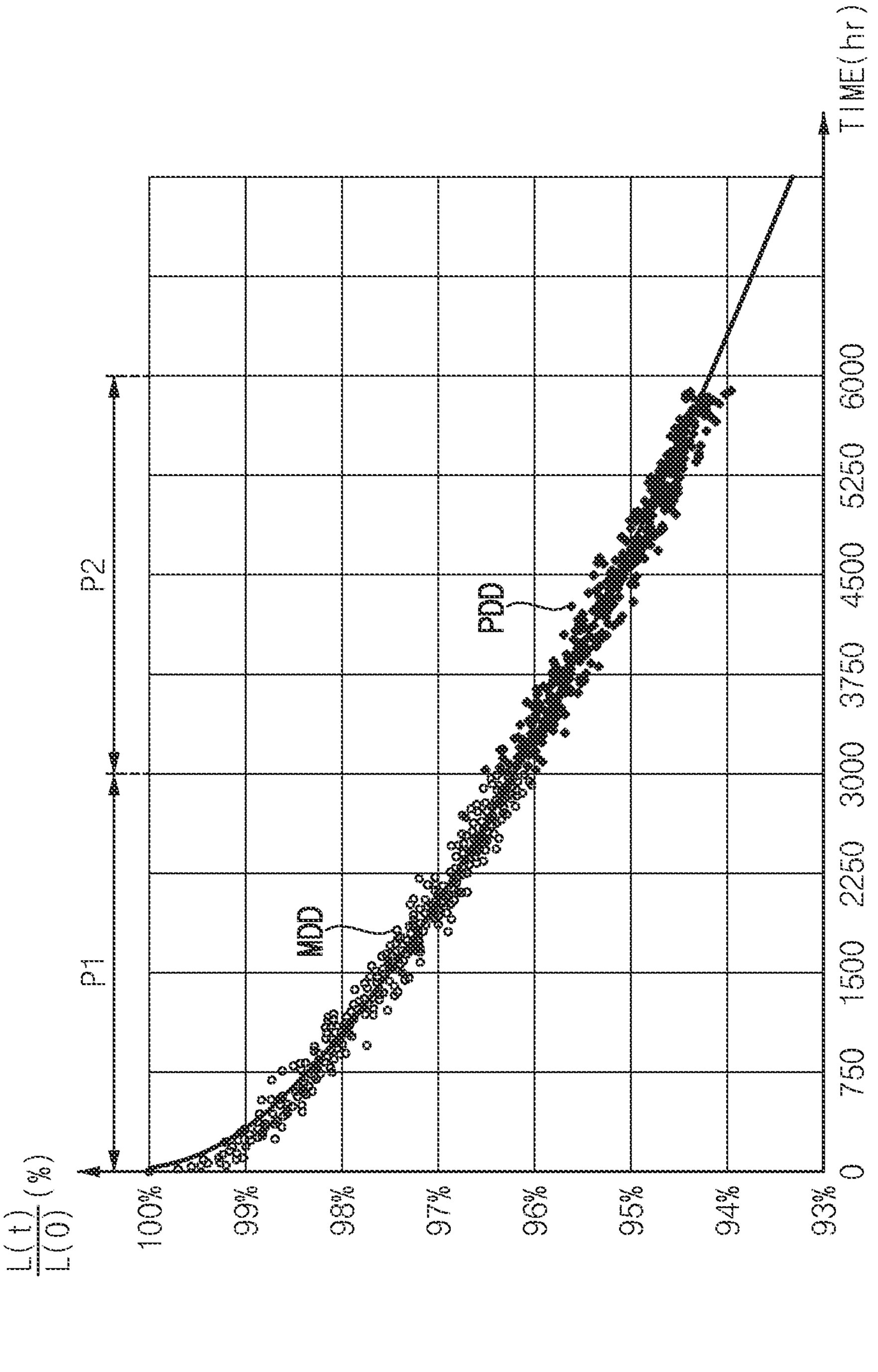
FIG. 6 is a graph illustrating the degradation rate data of FIG. 4 and a degradation model curve extracted based on the degradation rate data of FIG. 4.

FIG. 3 is a flowchart illustrating a method of predicting lifetime of the display device of FIG. 1, FIG. 4 is a graph illustrating a degradation rate data obtained by the method of predicting lifetime of the display device of FIG. 3 according to an embodiment, FIG. 5 is a graph illustrating a degradation rate data obtained by the method of predicting lifetime of the display device of FIG. 3 according to another embodiment, and FIG. 6 is a graph illustrating the degradation rate data of FIG. 4 and a degradation model curve extracted based on the degradation rate data of FIG. 4.

Referring to FIGS. 3 and 4, the method of predicting the lifetime of the display device according to an embodiment may include learning (or creating) a machine learning model based on a prior degradation rate data according to a degradation time for each of the pixels PX (S100), measuring a degradation rate data MDD for each of the pixels PX (S110), predicting a degradation rate data PDD for each of the pixels PX using the machine learning model (S120), and estimating a degradation rate for each of the pixels PX according to a degradation time based on the measured degradation rate data MDD and the predicted degradation rate data PDD (S130).

The degradation rate may be a ratio of an initial luminance to a luminance after being degraded due to a degradation. For example, the degradation rate data may be a degree of luminance degradation according to a driving voltage. In other words, the degradation rate data may be luminance decrease data.

For example, the prior degradation rate data may be a set of data values obtained by measuring a degree of luminance degradation for each of the pixels PX according to the driving voltage before a degradation experiment for estimating the lifetime of the display device DD. The prior degradation rate data may be training data input to the machine learning model.

The measured degradation rate data MDD may be a data value derived by measuring a degree of luminance degradation for each of the pixels PX according to the driving voltage through the degradation experiment.

The predicted degradation rate data PDD may be a data value derived by predicting a degree of luminance degradation for each of the pixels PX according to the driving voltage using the machine learning model.

The degradation experiment may need to be performed to reliably measure a degree of luminance degradation, and an output condition (e.g., the driving voltage) may need to be accurately defined. To this end, various driving voltages may be input to each of the pixels PX to measure luminance decrease data over time. For this purpose, a degradation pattern may be used, and for example, a degradation pattern including multiple data points for each of the pixels PX may be used.

Hereinafter, each step of the method of predicting the lifetime of a display device DD will be described in more detail.

First, the machine learning model may be learned (or created) based on the prior degradation rate data according to a degradation time for each of the pixels PX (S100).

As mentioned above, the prior degradation rate data may be a set of data values obtained by measuring a degree of luminance degradation for each of the pixels PX according to the driving voltage. For example, the prior degradation rate data may be a learned data input to the machine learning model.

In an embodiment, the prior degradation rate data may be obtained by repeatedly performing an experiment in substantially a same manner as the degradation experiment.

In an embodiment, the machine learning model may generate a predictive model which predicts a degree of luminance degradation for each of the pixels PX by learning the prior degradation rate data.

In an embodiment, the machine learning model may be learned based on at least one learning method including Linear Regression, Polynomial Regression, Principal Components Regression, Partial Least Squares Regression, Random Forest, Gradient Boosting, Extreme Gradient Boosting, Ridge Regression, and Lasso Regression.

In another embodiment, the machine learning model may be learned based on at least one learning method including Multilayer Perceptron, Bayesian Neural Networks, Radial Basis Functions, Generalized Regression Neural Networks, K-Nearest Neighbor Regression, Classification And Regression Tree, Support Vector Regression, and Gaussian Processes.

For example, the machine learning model may be learned based on Partial Least Squares Regression learning method. In case that the machine learning model is learned based on Partial Least Squares Regression learning method, accuracy of the predictive model for predicting a degree of luminance degradation for each of the pixels PX may be improved.

Thereafter, the degradation rate data MDD for each of the pixels PX may be measured (S110).

As mentioned above, the measured degradation rate data MDD may be a data value derived by measuring a degree of luminance degradation for each of the pixels PX according to the driving voltage through the degradation experiment. For example, the measured degradation rate data MDD may be a luminance decrease data value for each of the pixels PX measured through the degradation experiment.

As shown in FIG. 4, the measured degradation rate data MDD may be a degradation rate data graph over time.

For example, the measured degradation rate data MDD may be a data value representing a degree of luminance degradation for each of the pixels PX measured through the degradation experiment in a first period P1 having a first time length. In other words, the degradation experiment may be performed in the first period P1. For example, in the first period P1, the degradation rate data MDD for each of the pixels PX may be measured.

Thereafter, the degradation rate data PDD for each of the pixels PX may be predicted using the machine learning model (S120).

As mentioned above, the predicted degradation rate data PDD may be a data value derived by predicting a degree of luminance degradation for each of the pixels PX according to the driving voltage using the machine learning model.

For example, the predicted degradation rate data PDD may be a degree of luminance degradation for each of the pixels PX predicted by the predictive model generated from the machine learning model learned based on the prior degradation rate data.

In other words, the predicted degradation rate data PDD may be a luminance decrease data value for each of the pixels PX predicted to be measured in case that the degradation experiment is performed for each of the pixels PX for a specific time.

As shown in FIG. 4, the predicted degradation rate data PDD may be a degradation rate data graph over time.

For example, the predicted degradation rate data PDD may be a data value representing a degree of luminance degradation for each of the pixels PX predicted through the machine learning model in a second period P2 having a second time length. In other words, the predicted degradation rate data PDD may be a luminance degradation data value for each of the pixels PX predicted to be measured in case that the degradation experiment is performed on each of the pixels PX in the second period P2.

In an embodiment, the second period P2 may follow the first period P1. For example, on the graph of FIG. 4, the second period P2 may be located after the first period P1.

In other words, after the degradation rate data MDD for each of the pixels PX is measured in the first period P1, the degradation rate data PDD for each of the pixels PX may be predicted in the second period P2.

For example, in the first period P1, the degradation rate data MDD may be derived by measuring luminance degradation data by performing the degradation experiment on each of the pixels PX. In the second period P2 following the first period P1, the degradation rate data PDD may be derived by predicting luminance degradation data for each of the pixels PX using the machine learning model without performing a separate degradation experiment.

Accordingly, time required to derive luminance degradation data for each of the pixels PX through an actual experiment may be reduced. Accordingly, an efficiency of a process for estimating the lifetime of the display device DD may be improved.

In an embodiment, an end time of the first period P1 and a start time of the second period P2 may be same. For example, the second period P2 may continuously follow the first period P1. However, the disclosure is not necessarily limited thereto, and in another embodiment, a period may exist between the first period P1 and the second period P2.

In an embodiment, as shown in FIG. 4, the first time length of the first period P1 and the second time length of the second period P2 may be same.

For example, a luminance degradation data may be predicted by the machine learning model by inputting various driving voltages to each of the pixels PX for a time same as the time the luminance degradation data are measure by inputting various driving voltages to each of the pixels PX. Accordingly, a luminance degradation data substantially similar to data obtained by actually measuring a luminance degradation data for about twice as long as an actual measurement time of a luminance reduction data for each of the pixels PX may be derived. Accordingly, time for actually measuring a luminance reduction data may be reduced. However, the disclosure is not necessarily limited thereto, and the first time length of the first period P1 and the second time length of the second period P2 may be different.

Further referring to FIG. 5, the first time length of the first period P1 may be shorter than the second time length of the second period P2.

For example, a luminance degradation data may be predicted by the machine learning model by inputting various driving voltages to each of the pixels PX for a time longer than the time the luminance degradation data are measured by inputting various driving voltages to each of the pixels PX. Accordingly, a luminance degradation data substantially similar to data obtained by actually measuring a luminance degradation data for about more than twice an actual measurement time of a luminance reduction data for each of the pixels PX may be derived. Accordingly, time for actually measuring a luminance reduction data may be further reduced. However, the disclosure is not necessarily limited thereto, and the first time length of the first period P1 and the second time length of the second period P2 may be variously changed.

Thereafter, a degradation rate for each of the pixels PX may be estimated based on the measured degradation rate data MDD and the predicted degradation rate data PDD (S130).

An estimation of the degradation rate for each of the pixels PX may be performed by modeling a degradation model using the measured degradation rate data MDD and the predicted degradation rate data PDD. For example, as shown in FIG. 6, a degradation model may be created based on the measured degradation rate data MDD and the predicted degradation rate data PDD of FIG. 4.

In an embodiment, the estimation of the degradation rate for each of the pixels PX may be performed by modeling degradation amount information of the light emitting device with a degradation model defined as a degradation rate function over time.

The degradation model may be expressed by Equation 1 below.

$$\frac{L(t)}{L(0)} = A_0 e^{-1\times\left(\frac{t}{\tau}\right)^{\beta}} \qquad \text{[Equation 1]}$$

In the Equation 1, L(t) may be a current luminance, L(0) may be an initial luminance, $A_0$ may be an initial value of a degradation rate, τ may be a parameter which determines a rate of luminance decrease, β may be a parameter which determines a form of luminance decrease, and t may be time for which luminance decrease proceeded.

For example, τ may be inverse of a time taken until a luminance decreases to a ratio by continuously applying a constant voltage to an initial luminance and may correspond to the degradation rate. For example, τ may be degradation amount information of the light emitting device. β may be a constant value (stretch factor describing initial drop sharpness) determined for each of the pixels PX regardless of a gray level. For example, β may be information about a form of reduction in an amount of degradation of the light emitting device.

In an embodiment, after determining τ and β for each of the measured degradation rate data MDD and the predicted degradation rate data PDD, a degradation rate of each of the pixels PX may be estimated through the degradation model whose parameters are determined. For example, a time point at which a luminance decreases to a ratio compared to an initial luminance may be calculated, a degradation rate of each of the pixels PX may be estimated, and the lifetime of the display device DD may be predicted.

According to an embodiment, a degradation rate for each of the pixels PX may be estimated through the measured degradation rate data MDD and the predicted degradation rate data PDD. Accordingly, it is possible to reduce an error in an estimated degradation rate compared to a process of estimating a degradation rate only through the measured degradation rate data MDD. Accordingly, accuracy of a process for estimating the lifetime of the display device DD may be improved.

In another embodiment, the estimation of the degradation rate for each of the pixels PX may be performed by modeling degradation amount information of the light emitting device and degradation amount information of the driving element with a degradation model defined as a degradation rate function over time. For example, in a degradation rate estimation process, a behavior of the driving element may be considered in addition to a behavior of the light emitting device. Accordingly, an error in the estimated degradation rate may be further reduced. Accordingly, accuracy of a process for estimating the lifetime of the display device DD may be further improved.

In an embodiment, the degradation model may be expressed by Equation 2 below.

$$\frac{L(t)}{L(0)} = \left[1 + k \times \left\{1 - e^{-1\times\left(\frac{t}{\varepsilon}\right)^{\gamma}}\right\}\right] \times e^{-1\times\left(\frac{t}{\tau}\right)^{\beta}} \qquad \text{[Equation 2]}$$

In the Equation 2, L(t) may be a current luminance, L(0) may be an initial luminance, each of τ and ε may be a parameter which determines a rate of luminance decrease, each of β and γ may be a parameter which determines a form of luminance decrease, and t may be time for which luminance decrease proceeded.

For example, τ may be inverse of a time taken until a luminance decreases to a ratio by continuously applying a constant voltage to an initial luminance and may correspond to the degradation rate. For example, τ may be degradation amount information of the light emitting device. for example, ε may be inverse of a time taken until a luminance decreases to a ratio by continuously applying a constant current to an initial luminance and may correspond to the degradation rate. For example, ε may be degradation amount information of the driving element. Each of β and γ may be a constant value (stretch factor describing initial drop sharpness) determined for each of the pixels PX regardless of a gray level. For example, β may be information about a form of reduction in an amount of degradation of the light emitting device and γ may be information about a form of reduction in an amount of degradation of the driving element.

In the Equation 2, k may be information on whether overshoot or undershoot occurs in a form of reducing an amount of degradation of the driving element.

In an embodiment, after determining τ, β, ε, and γ for each of the measured degradation rate data MDD and the predicted degradation rate data PDD, a degradation rate of each of the pixels PX may be estimated through the degradation model whose parameters are determined. For example, a time point at which a luminance decreases to a ratio compared to an initial luminance may be calculated, a degradation rate of each of the pixels PX may be estimated, and the lifetime of the display device DD may be predicted.

According to an embodiment, the method of predicting the lifetime of the display device DD may include the learning the machine learning model based on the prior degradation rate data according to the degradation time of each of the pixels PX and the predicting the predicted degradation rate data PDD for each of the pixels PX by using the machine learning model.

Accordingly, time required to derive degradation rate data for each of the pixels PX through an actual experiment may be reduced. Accordingly, efficiency of a process for estimating the lifetime of the display device DD may be improved.

According to the method of predicting the lifetime of the display device DD, a degradation rate for each of the pixels PX may be estimated through the measured degradation rate data MDD derived by measuring a luminance decrease data for each of the pixels PX and the predicted degradation rate data PDD derived by predicting a luminance decrease data for each of the pixels PX using the machine learning model.

Accordingly, it is possible to reduce an error in an estimated degradation rate compared to a process of estimating a degradation rate only through the measured degradation rate data MDD. Accordingly, accuracy of a process for estimating the lifetime of the display device DD may be improved.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A method of predicting a lifetime of a display device, the method comprising:

creating a machine learning model based on prior degradation rate data according to a degradation time for each of pixels;

measuring, during a first period, a first degradation rate data for each of the pixels by inputting a voltage to each of the pixels;

predicting, during a second period, a second degradation rate data for each of the pixels using the machine learning model, the machine learning model predicting degradation amount information of a driving element for each of the pixels and degradation amount information of a light emitting device (LED) of each pixel to produce the second degradation rate data; and estimating a degradation rate for each of the pixels according to a degradation time based on the first degradation rate data and the second degradation rate data, wherein an end time of the first period and a start time of the second period are the same, wherein each of the pixels includes:

a light emitting device which emits light; and a driving element providing a driving current to the light emitting device, and in the estimating of the degradation rate for each of the pixels, the degradation rate is estimated by modeling degradation amount information of the light emitting device and a degradation amount information of the driving element with a degradation model defined as a degradation rate function over time, wherein the degradation model is expressed by Equation 2 below, $$\frac{L(t)}{L(0)} = \left[1 + k \times \left\{1 - e^{-1\times\left(\frac{t}{\varepsilon}\right)^{\gamma}}\right\}\right] \times e^{-1\times\left(\frac{t}{\tau}\right)^{\beta}}, \quad \text{[Equation 2]}$$

and in the Equation 2, L(t) is a current luminance, L(0) is an initial luminance, each of τ and ε is a parameter which determines a rate of luminance decrease, each of β and γ is a parameter which determines a form of luminance decrease, and t is time for which luminance decrease proceeded.

2. The method of claim 1, wherein the measuring of the first degradation rate data is performed in a first non-zero period having a first time length, and the predicting of the second degradation rate data is performed in a second period having a second time length.

3. The method of claim 2, wherein the first time length of the first period and the second time length of the second period are same.

4. The method of claim 2, wherein the first time length of the first period is shorter than the second time length of the second period.

5. The method of claim 1, wherein the machine learning model is created based on Linear Regression, Polynomial Regression, Principal Components Regression, Partial Least Squares Regression, Random Forest, Gradient Boosting, Extreme Gradient Boosting, Ridge Regression, and/or Lasso Regression.

6. The method of claim 1, wherein the machine learning model is created based on Multilayer Perceptron, Bayesian Neural Networks, Radial Basis Functions, Generalized Regression Neural Networks, K-Nearest Neighbor Regression, Classification And Regression Tree, Support Vector Regression, and/or Gaussian Processes.

7. The method of claim 1, wherein the light emitting device includes an organic material.

8. The method of claim 1, wherein the measuring the first degradation rate data comprises measuring each pixel multiple times.

9. The method of claim 2, wherein the measuring the first degradation rate data comprises measuring each pixel multiple times throughout the first period.

10. The method of claim 2, wherein a sum of the first time length and the second time length correspond to the lifetime of the display device.

11. A method of predicting a lifetime of a display device, the method comprising:

creating a machine learning model based on prior degradation rate data according to a degradation time for each of pixels;

measuring a first degradation rate data for each of the pixels by inputting a voltage to each of the pixels;

predicting a second degradation rate data for each of the pixels using the machine learning model; and estimating a degradation rate for each of the pixels according to a degradation time based on the first degradation rate data and the second degradation rate data, wherein each of the pixels includes:

a light emitting device which emits light; and a driving element providing a driving current to the light emitting device, and in the estimating of the degradation rate for each of the pixels, the degradation rate is estimated by modeling degradation amount information of the light emitting device and a degradation amount information of the driving element with a degradation model defined as a degradation rate function over time, wherein the degradation model is expressed by Equation 2 below, $$\frac{L(t)}{L(0)} = \left[1 + k \times \left\{1 - e^{-1\times\left(\frac{t}{\varepsilon}\right)^{\gamma}}\right\}\right] \times e^{-1\times\left(\frac{t}{\tau}\right)^{\beta}}, \quad \text{[Equation 2]}$$

and in the Equation 2, $L(t)$ is a current luminance, $L(0)$ is an initial luminance, each of $\tau$ and $\varepsilon$ is a parameter which determines a rate of luminance decrease, each of $\beta$ and $\gamma$ is a parameter which determines a form of luminance decrease, and t is time for which luminance decrease proceeded.

12. The method of claim 11, wherein the light emitting device includes an organic material.

13. The method of claim 11, wherein the measuring the first degradation rate data comprises measuring each pixel multiple times.

14. The method of claim 11, wherein the measuring of the first degradation rate data is performed in a first non-zero period having a first time length, and the predicting of the second degradation rate data is performed in a second period having a second time length.

15. The method of claim 14, wherein the measuring the first degradation rate data comprises measuring each pixel multiple times throughout the first time period.

16. The method of claim 11, wherein the machine learning model is created based on Linear Regression, Polynomial Regression, Principal Components Regression, Partial Least Squares Regression, Random Forest, Gradient Boosting, Extreme Gradient Boosting, Ridge Regression, and/or Lasso Regression.

17. The method of claim 11, wherein the machine learning model is created based on Multilayer Perceptron, Bayesian Neural Networks, Radial Basis Functions, Generalized Regression Neural Networks, K-Nearest Neighbor Regression, Classification And Regression Tree, Support Vector Regression, and/or Gaussian Processes.

* * * * *